Figure 1:
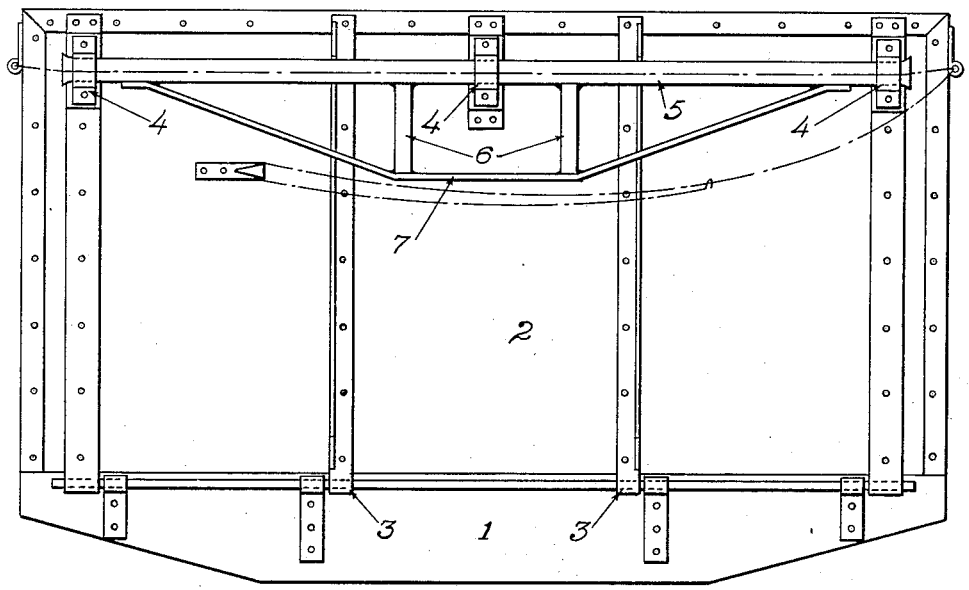

July 30, 1935.  C. KAKOSKA  2,009,621

BRACE FOR VEHICLE TAIL GATES

Filed Nov. 23, 1933

Inventor
CHRISTIAN KAKOSKA

By George C. Willcox.

Attorney

Patented July 30, 1935

2,009,621

UNITED STATES PATENT OFFICE 2,009,621

BRACE FOR VEHICLE TAIL-GATES

Christian Kakoska, Saginaw, Mich.

Application November 23, 1933, Serial No. 699,358

4 Claims. (Cl. 296—57)

This invention relates to an improved brace for stiffening the tail-gates forming the end closures of trucks, trailers and similar vehicles, and which are hinged to the vehicle beds at their horizontal bottom edges so that they may be raised and lowered to and away from their upright closed positions. Tailboards of this type heretofore have been exceedingly liable to warping and distortion in service. When the tail-gate is lowered to a horizontal position for loading or unloading the truck it is supported only at its lateral edges by chain hangers or the like. When heavy loads repeatedly rest upon or are rolled across the lowered tail-gate, it is soon distorted or broken. Truck owners caution their crews to use a gang-plank or rollways when loading or unloading, but these instructions are not observed in practice.

The object of my invention is to provide a strong but light bracing member which will effectively stiffen the tailboard when it is in its lowered, or open position, which will not add materially to the weight and cost of the tail-gate assembly, and which will be inconspicuous and will occupy little space when the tail gate is closed.

The invention broadly consists of an elongated brace member, greater in breadth than in thickness, which is pivotally mounted along one of its lateral edges on the outer face of the tailboard extending transversely thereof, so that when the gate is horizontal the brace may be turned or hang substantially perpendicular to the plane of the gate.

In its preferred form the improved brace is constructed as follows: A straight bracing member extends across the outside of the tail-gate near its upper edge and is rotatably mounted in aligned journals fixed to the gate. Projecting from one side of the rotatable bracing member and fixed thereto is a truss or other web-like stiffening member which extends along a substantial portion of the length of the bracing member. When the tail-gate is lowered to its horizontal position the off-center weight of the web or truss-like stiffening member turns the bracing member in its journals so that the stiffening member hangs vertically downward. In this position the web or truss is substantially perpendicular to the plane of the tail-gate so as to impart its maximum stiffening effect and most effectively resist the tendency of a heavy load to distort the gate. When the tailboard is raised to its upright position to close the end of the vehicle, the bracing member rotates in its journals and the stiffening truss hangs down parallel to the upright gate.

My invention provides a deep and light bracing element member which is always in position to stiffen the tail-gate when it is lowered for unloading the truck body; and which swings out of the way automatically when the tail-gate is closed, hanging down so that it does not project outward from the back of the truck body as would a rigidly fixed bracing member of the same dimensions.

The construction and operation of a preferred embodiment of the invention will now be described.

Referring to the drawing, Fig. 1 is an elevation of a truck tail-gate showing a preferred construction and application of the invention.

Figure 2:
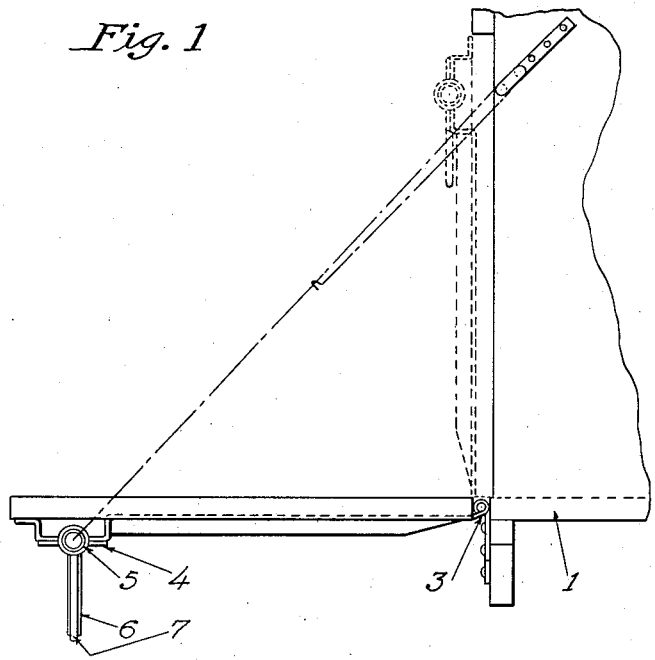

Fig. 2 is an end view of the tail-gate shown in Fig. 1, when lowered, showing the invention in its bracing position perpendicular to the plane of the gate.

Referring to Fig. 1, a truck frame 1 carries a tail-gate 2 hinged at 3. Fixed along or near the upper edge of the tail-gate are aligned journel blocks 4 spaced apart. Journaled in block 4 is a brace rod 5, preferably tubular in form, which extends substantially the full width of the gate. A convenient form of stiffening web or truss member which extends along one side of the brace rod 5 comprises a pair of parallel struts 6 which project radially from the rod 5 and are welded or otherwise suitably secured thereto. A tie-rod 7 connects and is fixed to the outer ends of the struts 6, and at its extremities is welded to the tubular brace rod 5 near its outer ends.

Fig. 2, in solid lines, shows the gate 2 in its lowered position. The weight of the truss assembly has caused the brace rod 5 to rotate so that the truss is in position most effectively to stiffen the brace and the gate against buckling under load. When the gate is raised the truss member rotates in journals 4 and maintains its vertically depending position, as indicated in the dotted lines. When the gate is closed the bracing assembly hangs close to the surface of the gate, occupying a minimum of space.

The invention is not limited to the particular structure shown and described. Various changes and modifications in materials and construction may be made without departing from the spirit of the invention. For example, a one-piece flat steel web may be welded along the length of the rotatable brace rod to produce the desired stiffening effect, or such a web may be cast integral with the rod to provide sufficient off-center weight to rotate the brace, and keep the stiffening member in a vertically depending position whether the tailboard is raised or lowered.

Having thus described my invention, what I claim and desire to secure by Letters Patent is:—

1. A bracing assembly for the tail-gate of a vehicle, comprising three or more journals aligned and spaced transversely of the gate, a brace-bar rotatably mounted in said journals and a stiffening member projecting from one side of and extending a major part of the length of said brace bar and fixed thereto at its ends and one or more points between said ends.

2. The structure claimed in claim 1, wherein said stiffening member comprises one or more struts fixed perpendicular to said brace-bar and a tie-rod fixed at its ends to said brace-bar and intermediate its ends to the free end or ends of said strut or struts.

3. A brace for the tail-gate of a vehicle comprising in combination an elongated bracing member journaled thereon for free pivotal motion and extending transversely of the outer face of the gate, and a lengthwise stiffening member projecting from one side of said bracing member, whereby the weight of the stiffening member will cause the bracing member to rotate as the gate is raised or lowered so that the stiffening element will at all times depend therefrom substantially vertically.

4. A brace for the tail-gate of a vehicle comprising an elongated member greater in breadth than in thickness, journalled for free pivotal motion along one of its lateral edges to the outer face of the tail-gate and extending transversely thereof, whereby said member will hang substantially perpendicular to the plane of the gate when the gate is lowered to a horizontal position.

CHRISTIAN KAKOSKA.